United States Patent Office 3,130,217
Patented Apr. 21, 1964

3,130,217
PRODUCTION OF O,O-DIALKYLDITHIOPHOSPHORYLFATTY ACID AMIDES
Heiner Dickhaeuser and Heinz Pohlemann, Ludwigshafen (Rhine), and Richard Sehring, Ingelheim (Rhine), Germany, assignors to Badische Anilin- & Soda-Fabrik Aktiengesellschaft, Ludwigshafen (Rhine), Germany
No Drawing. Filed Oct. 8, 1962, Ser. No. 229,163
Claims priority, application Germany Oct. 11, 1961
3 Claims. (Cl. 260—461)

This invention relates to the production of O,O-dialkyldithiophosphorylfatty acid amides. More particularly, the invention relates to a process for the production of the said amides which dispenses with the isolation of intermediates.

It is known to prepare amides of O,O-dialkyldithiophosphorylfatty acids by reaction of an alkali metal salt of an O,O-dialkyldithiophosphoric acid with an ω-halofatty acid amide.

The disadvantage of this method lies in the difficulty in preparing the halofatty acid amides because the halofatty acid chlorides required for their preparation are difficult to handle.

It is further known to prepare the said O,O-dialkyldithiophosphorylfatty acid amides by reacting O,O-dialkyldithiophosphorylfatty acid esters with molar amounts of a primary or secondary amine.

This process is an improvement over the first-mentioned method but still has disadvantages. Thus the O,O-dialkyldithiophosphorylfatty acid esters required must be prepared in a separate process and isolated. Having regard to the toxicity and offensive odor of such phosphoric esters, a multistage process including isolation of the intermediates on a large scale can only be carried out with difficulty.

We have now found that O,O-dialkyldithiophosphorylfatty acid amides are obtained without isolation of intermediates by reacting phosphorus pentasulphide with an alcohol to form the corresponding O,O-dialkyldithiophosphoric acid and then without isolating the acid reacting it with an equivalent amount of an amine of the general formula $HNR_3R_4$, in which $R_3$ and $R_4$ are identical or different and may denote hydrogen or an alkyl or aryl radical or together with the nitrogen may denote a heterocyclic radical, and a bis-halofatty acid ester of the formula

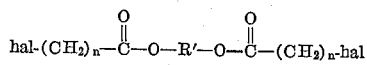

in which hal denotes a halogen, especially chlorine, $n$ a whole number from 1 to 6 and $R'$ a linear or branched alkylene radical, and then effecting reaction with an amount of a strongly alkaline compound which is equivalent to the O,O-dialkyldithiophosphoric acid previously formed as intermediate.

In the process according to this invention, an alcohol may first be allowed to act in conventional manner in an inert diluent, for example benzene, toluene, methylene chloride or carbon tetrachloride, on phosphorus pentasulfide. The solution thus obtained is then reacted with the amine, with a halofatty acid ester and with a strongly alkaline compound.

In the first part of the reaction including the reaction with the bis-halofatty acid ester it is advantageous to work between 0° and 100° C., especially between 30° and 70° C.; in the second part of the reaction, i.e., in the reaction with the strongly alkaline compound, the temperature is lowered to +10° to −10° C.

The amine $HNR_3R_4$ may be dripped in in pure form, or introduced in gaseous form, or, when it is very volatile, added dissolved in a solvent, for example water, alcohol, a ketone, methylene chloride, or toluene.

The strongly alkaline compounds may be especially solutions of alkali metal hydroxides in water or organic solvents, alkali metal alcoholates or tertiary organic amines capable of setting free the amine $HNR_3R_4$ from its salts. To achieve a particularly good yield, it is recommendable to add a small excess amount of amine $HNR_3R_4$ to the reaction mixture prior to the addition of the alkali. Furthermore the O,O-dialkylphosphoric acid formed from $P_2S_5$ and alcohol may be transferred, by treatment with an aqueous solution of the amine $HNR_3R_4$ from the organic solvent into the aqueous solution, the organic solvent, together with any impurities dissolved therein, separated and the aqueous solution further reacted in accordance with this invention.

The bishalofatty acid esters are derived from diols of the formula HO—$R'$—OH in which $R'$ has the above significance. Examples of suitable diols whose halofatty acid esters are suitable for the process according to this invention are: ethylene glycol, propylene glycol, propanediol-1,3, butanediol-2,3, butanediol-1,4 and hexanediol-1,6.

The desired O,O-dialkyldithiophosphorylfatty acid amides are obtained by the process according to this invention in a surprisingly simple way, with good yields and in a high purity. Above all it is possible, without isolating intermediates, for example by working in a single reaction vessel, to minimize or even completely obviate the known disadvantages of working with phosphoric acid esters, such as troublesome odor and contact with strongly toxic intermediates.

The yields obtainable by the process according to this invention are substantially higher than the yields by the prior art methods.

The process according to this invention is illustrated by, but not limited to, the following example. The parts are by weight.

*Example*

80 parts of methanol is added at 40° to 50° C. to 111 parts of phosphorus pentasulfide suspended in 250 parts of toluene. The whole is gently boiled under reflux for another hour while leading nitrogen therethrough. Then 40 parts of toluene is distilled off in vacuo and 123 parts of 25% aqueous methylamine solution is added at 15° to 25° C. After the organic phase has been separated, the aqueous solution has 107 parts of glycol-bis-chloroacetic acid ester added thereto and the whole is heated at 60° C. for five hours. The whole is then cooled to −5° C., 64 parts of 50% caustic soda solution is dripped in within an hour and then 40 parts of 35% aqueous methylamine solution within another hour, all at −5° to 0° C. Stirring is then continued for another three hours at 0° C. 300 parts of toluene is added and then the aqueous layer is separated, the organic solution washed for a short time with water and the toluene removed in vacuo. 188 parts of a practically colorless oil remains which solidifies upon cooling. The product has the formula

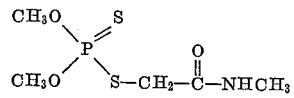

What we claim is:
1. A process for the production of O,O-dimethyldithiophosphorylacetic acid N-methylamide which comprises: reacting phosphorus pentasulfide with methanol to form the corresponding O,O-dimethyldithiophosphoric acid, and, without isolating the acid, reacting said acid with an equivalent amount of methylamine and with gylcol-bis-chloroacetate, and thereafter, without isolating the ester, reacting the ester with a strongly alkaline compound in an amount equivalent to the O,O-dimethyldithiophosphoric acid formed as an intermediate, said strongly alka- line compound being selected from the group consisting of a solution of an alkali metal hydroxide, a solution of an alkali metal alcoholate, and a tertiary organic amine capable of setting free methylamine from its salts.

2. A process as in claim 1 wherein the reaction including the reaction with glycol-bis-chloroacetate is carried out at a temperature between 30 and 70° C., and wherein the reaction with the strongly alkaline compound is carried out at a temperature between +10 and −10° C.

3. A process for the production of O,O-dimethyldithiophosphorylacetic acid N-methylamide which comprises: reacting phosphorus pentasulfide with methanol to form the corresponding O,O-dimethyldithiophosphoric acid, and, without isolating the acid, reacting said acid with an equivalent amount of methylamine and with glycol-bis-chloroacetate, and thereafter, without isolating the ester, reacting the ester with an aqueous solution of sodium hydroxide in an amount equivalent to the O,O-dimethyldithiophosphoric acid formed as an intermediate.

References Cited in the file of this patent
UNITED STATES PATENTS

| 3,032,579 | Losco et al. | May 1, 1962 |
| 3,047,459 | Perini et al. | July 31, 1962 |

OTHER REFERENCES

Kosolapoff: "Organo-Phosphorus Compounds," John Wiley & Sons, 1950, page 236. (Copy in Scientific Library.)